Jan. 1, 1935.  F. WUNSCH  1,985,967
TEMPERATURE MEASURING SYSTEM
Filed May 29, 1931  2 Sheets-Sheet 2

Inventor
Felix Wunsch
By Cornelius D. Ehret
his Attorney.

Patented Jan. 1, 1935

1,985,967

UNITED STATES PATENT OFFICE 1,985,967

TEMPERATURE MEASURING SYSTEM

Felix Wunsch, Philadelphia, Pa., assignor to Leeds & Northrup Company, Philadelphia, Pa., a corporation of Pennsylvania Application May 29, 1931, Serial No. 540,868

8 Claims. (Cl. 73—32)

My invention relates to systems or circuits in which thermo-electric couples are utilized for any purpose, such as temperature measurements to obtain an indication, a record, or control, of temperature.

In accordance with my invention, thermo-couples located at different points are connected in parallel to produce an electro-motive force representative of the average of the temperatures at the different points and more particularly, resistances are connected in series with the thermo-couples to minimize or reduce to negligible value error occasioned by differences or variation in the resistance of the thermo-couples, or of leads connecting the thermo-couples or both.

More specifically, the magnitude of each of the resistances is large relative to the differences between or variations in resistance of the thermo-couples and/or leads connecting them but preferably not so large as materially to impair the sensitivity of the system.

Further in accordance with my invention, the thermo-couples in parallel to each other and each in series with a resistance, as aforesaid, are connected to a network, as a potentiometer network including an instrument for measuring an electro-motive force jointly produced by the thermo-couples, and which may be utilized to indicate, record, or control average temperature.

Figure 1:
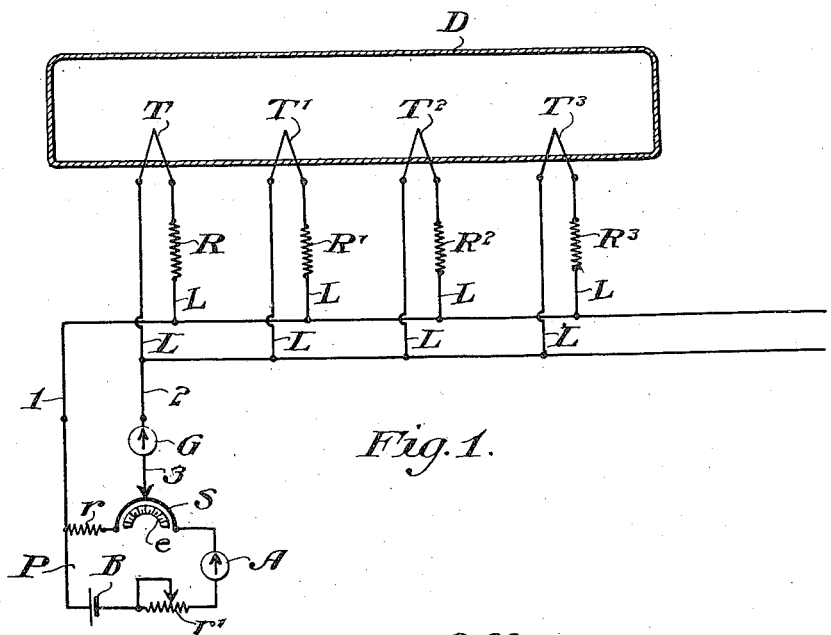

For an understanding of my invention, reference is to be had to the accompanying drawings, in which:

Fig. 1 illustrates diagrammatically a temperature measuring system.

Figure 2:
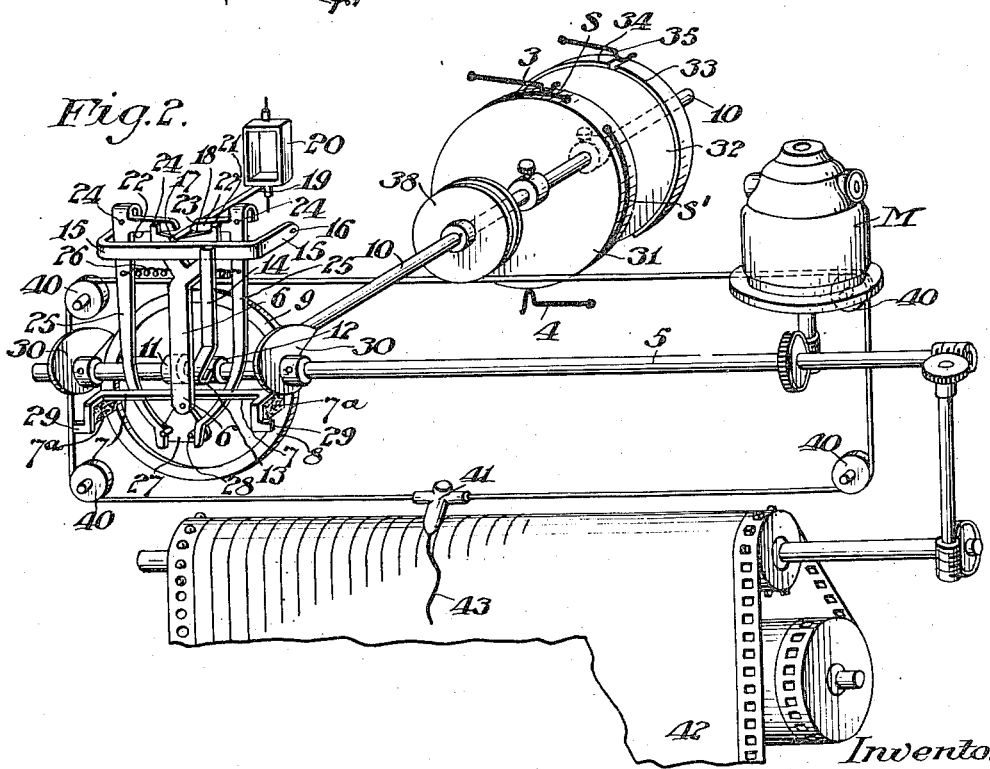

Fig. 2, in perspective, illustrates recording and controlling mechanism utilizable in accordance with my invention.

Figure 3:
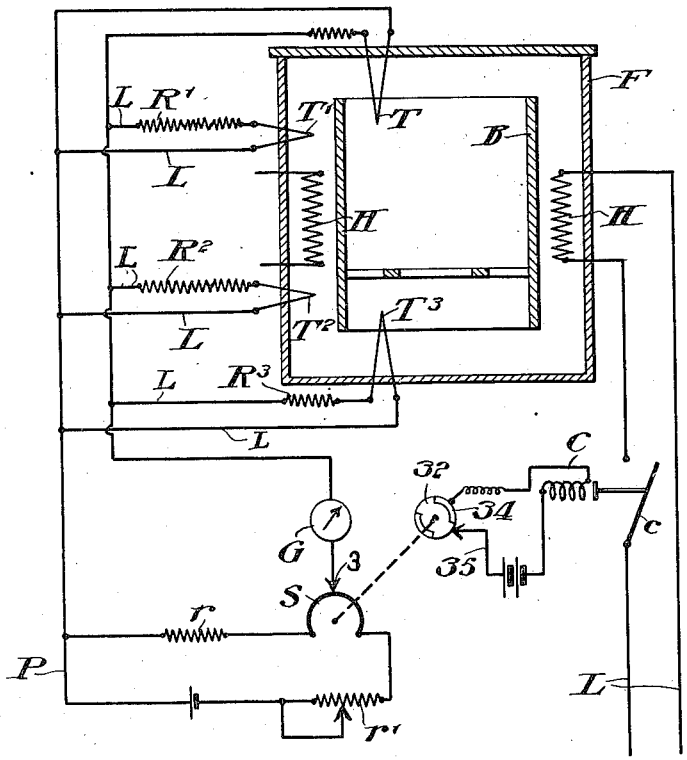

Fig. 3 diagrammatically represents a control system including the measuring circuit of Fig. 1.

Figure 4:
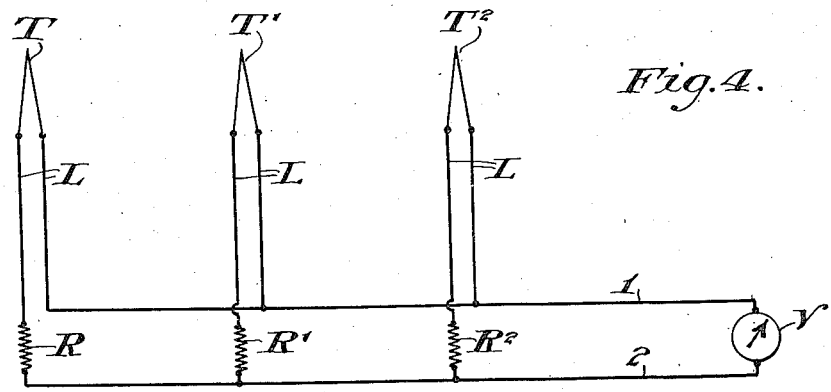

Fig. 4 illustrates another temperature measuring system.

It is often desirable to measure the average of several temperatures in order to indicate, record, or control the average of the temperatures at different points, without separately measuring the temperature at any one or more of the points.

Referring to Fig. 1, the thermo-couples T, T1, T2, and T3 are disposed at points more or less remote from one another and at which the temperature may be of different magnitudes, for example, the thermo-couples may be in different regions in duct D, through which for example, flue gases are passing. The thermo-couples are connected by their leads L in parallel across the conductors 1, 2, leading to a measuring circuit, for example, a potentiometer network P having a slide wire S and relatively movable contact 3 with which co-acts a temperature scale $e$, or equivalent. The current flowing through the potentiometer P is adjusted by variation of the resistance $r1$, until the desired value is indicated by the meter A. The difference of potential between the conductors 1 and 2, which is the average of the electro-motive-forces, produced by the several thermo-couples, is balanced against that of the potentiometer circuit by relatively moving the contact 3 and slide-wire S until there is no deflection of the galvanometer G. The average temperature to which the thermo-couples are subjected is then directly indicated by the scale $e$.

With the system thus far described, there may be serious error due to differences between and/or variations in the resistance of the thermo-couples, the leads connecting the thermo couples, or both. When the thermo-couples are connected in parallel as shown, and are at different temperatures to produce different electro-motive-forces, there is a current circulating between the thermo-couples though there is no flow of current through the galvanometer G to the potentiometer circuit when the system is balanced. For example, considering only two parallel connected thermocouples subjected to different temperatures, if the resistances of the parallel connected thermocouple circuits are substantially equal, the circulating current therebetween, due to the difference of their thermo-electro-motive forces, will produce equal voltage drops therein which act cumulatively with respect to the generated thermo-electromotive force of one thermocouple and differentially with respect to that of the other. The electromotive force across their points of parallel connection will, therefore, be the true average of their electromotive forces. If, however, the resistance of the parallel connected thermocouple circuits are appreciably different, the circulating current therebetween will produce a larger voltage drop in one circuit than in the other, and the apparent average voltage between their points of parallel connection will not be the true average voltage. Obviously, these same principles apply with equal force to a plurality of more than two parallel connected thermocouple circuits.

The voltages produced by the thermo-couples are relatively small and any difference in the resistances of the thermo-couples and/or their leads, materially changes the potential difference across the conductors 1, 2, which is balanced in the potentiometer network. This non-uniformity of resistance may be due to differences in construction, aging at different rates, subjection of the different thermo-couples to temperatures which are different, etc. To minimize the effect of non-uniformity of resistance of the parallel connected thermo-couple circuits in unbalancing or unequalizing the voltage drops therein due to the flow of circulating currents therebetween, there is included in series with each of the thermo-couples, a resistance which is large in comparison with the variations in or difference between the resistances of the thermo-couples and leads connecting them to each other.

Specifically, the resistances R, R1, R2, and R3 are connected in series respectively with the thermo-couples T, T1, T2 and T3 across the conductors 1 and 2. The total of each resistance may be disposed in one lead L from a thermo-couple as indicated, or divided between the pair of leads. A suitable value for these resistances will ordinarily be of the order of 10 ohms, although it will be understood that other and substantially different values may be used. When the thermo-couples are quite similar, the resistances preferably will be of equal or substantially equal magnitude, in order that the total resistance of each of the parallel branches comprising a thermo-couple, its leads and associated resistance in series, should be about the same as the total resistance of the other shunt branches.

When the resistance of the individual couples plus the resistance of the associated leads are equal, the resistors R, R1, etc., may be omitted, though preferably they are retained to minimize any subsequent unequality of thermo-couple resistance due to unlike aging, for example.

With the resistances connected in series with the individual thermocouples, the resistance of the thermo-couples or connecting wires has a negligible effect upon the average potential difference between conductors 1 and 2, so that within very close limits the scale e will indicate the average temperature of the thermocouples even though there is considerable difference in the resistances of the thermo-couples or their leads.

The addition of resistances R, R1, R2, and R3, etc., does not appreciably affect the sensitivity of the measuring system as they are in shunt to each other and their joint resistance is low.

For recording, indicating, or controlling average temperature, the multiple thermo-couple circuit of Fig. 1 may be connected to the galvanometer G of the apparatus shown in Fig. 2 which is similar to that described in my Patent No. 1,751,539 and corresponds generally to structure disclosed in Leeds Patent 1,125,699.

Referring to Fig. 2, M is an electric motor or other suitable source of power rotating the shaft 5 at substantially constant speed. A lever 6 is pivoted at its upper end on a horizontal axis and has pivoted thereto on a horizontal axis at its lower end the arm 7, on each end of which is a shoe 7a, of cork or the like, frictionally engaging the rim 8 of the clutch disc or wheel 9, secured upon the shaft 10 of the movable structure or system. Secured upon the shaft 5 is a cam 11, which periodically engages the lever 6 and moves it outwardly, in opposition to a spring, not shown, thereby lifting the shoes 7a from the rim 8, the spring returning the shoes into engagement with the rim after predetermined rotation of the cam 11. Upon the shaft 5 is secured a second cam 12, which, after the shoes 7a have been lifted from the rim by the cam 11, actuates the finger 13 on the lower end of the arm 14 secured at its upper end to the member 15 pivoted on a horizontal axis at 16. Upon the member 15 is secured the member 17, whose upper edge 18 is inclined outwardly from the center. Disposed immediately above the edge 18 is the aforesaid needle or pointer 19 of the alternating current galvanometer whose coil is 20. At the opposite ends of the member 17 are the abutments 21 for limiting the deflection of the needle 19. Directly above the needle 19 and beneath which it normally freely swings are the edges 22, preferably straight and horizontal, upon the members 23, 23 pivoted at 24, 24, and extending toward each other, leaving a gap of sufficient width between their inner ends for free entry of the needle 19 when in balanced or zero position, corresponding with a balance of the potentiometer of the character shown in Figs. 1 and 3. The needle 19 normally swings freely between the edge 18 and the members 23, 23, which latter have downwardly extending arms 25, 25, biased toward each other by the spring 26. Attached to the lower end of the arm or lever 6 is a triangular plate 27 carrying the pins 28, 28, cooperating with the lower ends of the members 25, 25. At opposite ends of the arm 7 are the lugs 29, 29, adapted to be engaged by the cams 30, 30, similar in shape and similarly positioned and secured upon the shaft 5.

As the galvanometer needle 19 deflects in the one direction or the other, the shaft 10 will be rotated in the one direction or the other, and to an extent corresponding to the extent of the galvanometer deflection. For example, when the needle 19 deflects to the right, Fig. 2, due to periodic vertical movement of member 15 by cam 12, the needle 19 is clamped between the inclined edge 18 and lower edge 22 of the right hand member 23 causing the arm 25 to be tilted in a clockwise direction about its pivot 24, thereby pushing the right hand pin 28 on plate 27, and so tilting the movable or driving clutch or arm 6 in a clockwise direction while cam 11 is holding shoes 7, 7 from the rim 8 of clutch wheel 9, the angular movement of the member 6 being dependent upon the degree of deflection of needle 19. The cam 11 soon thereafter allows the shoes to again grip the rim 8 of wheel 9 and soon thereafter the left hand cam 30 engages the ear 29, which has been elevated, pushing it downwardly due to rotation of shaft 5, to restore it to the horizontal position indicated, but in so moving back to normal position the clutch member rotates the disc 9 and shaft 10 affixed thereto in a counter-clockwise direction.

Secured upon the shaft 10 is a disc 31 of insulating material, carrying upon its periphery the aforesaid resistances or impedances S, S1, which in this example, as indicated in Fig. 3, are rotated, while their co-acting contacts 3 and 4 are stationary. Secured upon the shaft 10 is a second disc 32 carrying the arcuate contacts 33 and 34, with which co-acts the stationary contact or brush 35. The discs 31 and 32 are adjustable to any suitable angle with respect to each other and with respect to the shaft 10 by suitable set screws.

Secured upon the shaft 10 is the grooved pulley wheel 38, around which is wrapped the cord 39, which passes over the idler rollers 40 and has attached thereto the pen or marker 41 for drawing upon the record sheet or paper 42 a mark or record 43, of the changes of average temperature. The paper 42 is driven by the motor M, as well understood in the art. Disc 31 may carry the temperature scale e co-acting with stationary pointer d.

Referring to Fig. 3 the measuring circuit of Fig. 1 is utilized to control the average temperature of a furnace F, which specifically is heated by resistors H, though it will be understood that it may be heated in any other suitable manner. The thermo-couples T, T1, T2 and T3 are disposed in and at various locations in the furnace, some for example, may be more adjacent the work within the chamber or container B while others as T1 and T2 may be more remote, as in regions of the furnaces more adjacent the heaters, or equivalent. The control disc 32 may be adjusted on the shaft 10 so that the contacts 34 and 35 are out of engagement when the stylus 41 is at a position on the chart or scale corresponding to the desired average temperature of the furnace. So long as the average of the temperatures to which the thermo-couples are responsive is of the desired magnitude a galvanometer G does not deflect. When, however, the average temperature increases above the desired maximum, even though the temperature at one or more of the thermo-couples may be below the maximum, the galvanometer G deflects in such sense that the control shaft 10 is rotated to separate contacts 34 and 35 to decrease the heat supplied to the furnace, as by opening the switch c in the line L of the heaters, by de-energization of the relay C. When the average of the temperatures in the various portions of the furnace drop to the desired value, the control shaft 10, by deflection of galvanometer G, again rotates to restore the engagement between contacts 34 and 35, to increase the heat supplied to the resistors.

The control system has been disclosed as of the simple on-off type but it will be understood that it may be of the progressive type, as disclosed for example in Harsch Patent 1,578,027.

While preferably the shunt connected thermo-couples are associated with a measuring network, as the potentiometer circuit of Fig. 1, with calibrated impedance adjusted until there is no deflection of a galvanometer, the conductors 1 and 2 from the thermo-couples may be connected as shown in Fig. 4 to an instrument V, as a milli-volt meter, which may be utilized to indicate, record or control the average of the temperatures to which thermo-couples T, T1, and T2 are subjected. For indicating average temperature, the scale of the instrument is suitably graduated in temperature units.

Though for illustration, my invention has been described as utilized in specific types of measuring, recording and control systems, it will be understood that it is of general utility in temperature measuring systems.

What I claim is:

1. A system for measuring the average of temperatures at a plurality of different regions comprising a pair of conductors extending adjacent said regions, and, at each of said regions, a thermo-couple connected across said conductors and a resistance connected in series therewith, said resistance being of a magnitude substantially greater than the variation in resistance of said thermo-couple and said conductors and effective to minimize inequalities in the voltage drops in the parallel connected thermocouple circuits due to the circulating currents between any two couples.

2. A system for measuring the average of temperature at different regions comprising a pair of conductors extending adjacent said regions, thermo-couples disposed at said regions, connections from each of said thermo-couples to said conductors including resistance substantially greater than the resistance variations of the thermo-couple and of the conductors and effective to minimize inequalities in the voltage drops in the parallel connected thermocouple circuits due to the circulating currents between any two couples, and means for measuring the difference of potential between said conductors.

3. A system for measuring the average of temperatures at different regions comprising indicating apparatus having a temperature scale, a pair of conductors extending therefrom adjacent said regions, thermo-couples disposed at said regions, connections from said thermo-couples in parallel, and resistors in said connections whose magnitude of resistance is substantially greater than the variations in resistance of the thermocouples and of the conductors inter-connecting them and effective to minimize inequalities in the voltage drops in the parallel connected thermocouple circuits due to the circulating currents between any two couples.

4. A system for measuring the average of temperatures at different regions comprising conductors extending adjacent said regions, thermo-couples at said regions, connections from said thermo-couples to said conductors for connecting them in parallel, electro-responsive means associated with said conductors and including movable structure, and resistors in said connections whose resistance is materially greater than the variations in resistance of said thermocouples and conductors interconnecting them and effective to minimize inequalities in the voltage drops in the parallel connected thermo-couple circuits due to the circulating currents between any two couples.

5. A system for measuring the average temperature of a stream of fluid comprising thermo-couples at different points in the stream, a pair of conductors extending adjacent said points, connections from said thermo-couples to said conductors for connecting the thermo-couples in parallel, means for measuring the difference in potential between said conductors, and resistance in each of said connections whose magnitude is materially greater than the variations in resistance of the associated thermo-couple and effective to minimize inequalities in the voltage drops in the parallel connected thermocouple circuits due to the circulating currents between any two couples.

6. A system for measuring the average of temperatures at different regions of a chamber comprising thermocouples disposed at said regions, leads extending externally of said chamber and connecting said thermocouples in parallel, and resistances individual to said thermocouples disposed externally of said chamber and included in series with the thermocouples and leads, the magnitudes of said resistances being substantially greater than the resistances of the thermocouples and effective to minimize inequalities in the voltage drops in the parallel connected thermocouple circuits due to the circulating currents between any two couples.

7. A system for measuring the average of temperatures at different regions comprising thermocouples disposed at said regions, leads for connecting said thermocouples in parallel, and resistances individual to said thermocouples in series with the parallel-connected thermocouples and each of a magnitude substantially greater than any variation in thermocouple and lead resistance and effective to minimize inequalities in the voltage drops in the parallel connected thermocouple circuits due to the circulating currents between any two couples.

8. A system for measuring the average of temperatures at different regions of a chamber comprising a potentiometer network having a point of fixed potential and a contact adjustable to provide a point of variable potential, conductors from said points of said potentiometer network, thermocouples disposed at said regions of said chamber, leads extending externally of said chamber and connecting said thermocouples in parallel across said conductors, resistances individual to said thermocouples included in series with the thermocouples and leads, the magnitudes of said resistances being substantially greater than the resistances of the thermocouples and leads and effective to minimize inequalities in the voltage drops in the parallel connected thermocouple circuits due to the circulating currents between any two couples, a current-responsive device in one of said conductors between one of said points and the nearest thermocouple, to be outside of the path of current circulating between the couples, and to indicate when balance is effected between the average voltage of the thermocouple and the voltage between said points of the network.

FELIX WUNSCH.